United States Patent [19]

Vong

[11] 4,397,671
[45] Aug. 9, 1983

[54] METHOD OF PLACING A METAL OXIDE FILM ON A SURFACE OF A HEATED GLASS SUBSTRATE

[75] Inventor: Sandy T. S. Vong, Ann Arbor, Mich.

[73] Assignee: Ford Motor Company, Dearborn, Mich.

[21] Appl. No.: 434,642

[22] PCT Filed: Sep. 20, 1982

[86] PCT No.: PCT/US82/01299
§ 371 Date: Sep. 20, 1982
§ 102(e) Date: Sep. 20, 1982

Related U.S. Application Data

[63] Continuation-in-part of Ser. No. 325,891, Nov. 30, 1981, abandoned.

[51] Int. Cl.³ .................................... C03C 17/245
[52] U.S. Cl. ................... 65/60.52; 427/190; 427/255; 427/314; 427/168; 427/180; 427/226; 427/421; 427/427; 427/424
[58] Field of Search ............... 427/252, 253, 255, 314, 427/190, 168, 180, 226, 421, 427, 424; 65/60.3, 60.4, 60.52

[56] References Cited

U.S. PATENT DOCUMENTS

| | | |
|---|---|---|
| 3,081,200 | 3/1963 | Tompkins . |
| 3,598,635 | 8/1971 | Sagong ............................ 65/60.4 |
| 3,852,098 | 12/1974 | Bloss . |
| 4,125,391 | 11/1978 | Laethem ............................ 427/252 |
| 4,182,783 | 1/1980 | Henery ............................. 427/255.2 |
| 4,188,199 | 2/1980 | Laethem et al. .................. 427/252 |
| 4,217,392 | 8/1980 | Vong ................................. 428/432 |
| 4,325,988 | 4/1982 | Wagner ............................ 427/168 |
| 4,330,318 | 5/1982 | Van Cauter et al. ............. 427/168 |
| 4,344,986 | 8/1982 | Henery ............................. 427/168 |

FOREIGN PATENT DOCUMENTS

| | | |
|---|---|---|
| 2529076 | 3/1976 | Fed. Rep. of Germany . |
| 2529077 | 3/1976 | Fed. Rep. of Germany . |
| 2529079 | 3/1976 | Fed. Rep. of Germany . |
| 2806468 | 8/1978 | Fed. Rep. of Germany ..... 65/60.52 |

Primary Examiner—Norman Morgenstern
Assistant Examiner—Janyce A. Bell
Attorney, Agent, or Firm—William E. Johnson; Olin B. Johnson

[57] ABSTRACT

A method of placing a metal oxide film on a surface of a heated glass substrate (16) is disclosed. The glass substrate is one which is being moved in a selected direction from a glass manufacturing process (20) and is one which would have a temperature in a range from 700°–1200° F. (370°–650° C.). The method is accomplished by spraying a heat decomposable, organic based metal salt onto the glass ribbon. The spray powder is delivered by means of a gaseous stream to a location spaced above the moving substrate. The spray powder is then accelerated from the location spaced above the moving glass substrate. The acceleration is accomplished by entraining the spray powder in a high velocity stream of air. The accelerated spray powder is directed downwardly toward the moving glass substrate and longitudinally along the selected direction of movement of the glass substrate. Individual particles of the spray are either vaporized, decomposed and reacted with oxygen to form a tightly adherent coating on the glass substrate, or they are rapidly exhausted.

5 Claims, 2 Drawing Figures

METHOD OF PLACING A METAL OXIDE FILM ON A SURFACE OF A HEATED GLASS SUBSTRATE

This application is a continuation-in-part of my application Ser. No. 325,891, filed Nov. 30, 1981, now abandoned.

TECHNICAL FIELD

This invention relates to a method of placing a metallic oxide film on a surface of a heated glass substrate. In particular, the method has been developed for placing such a metal oxide film on a heated glass substrate as that glass substrate is being moved in a selected direction from a glass manufacturing process. The inventive process is one in which a spray powder is formed from organic based metal salts which are heat decomposable. The spray powder is pyrolyzed when it is sprayed against the surface of the heated glass substrate so that the organic based metal salts are decomposed to form the metal oxide film on the surface of the glass substrate.

BACKGROUND ART AND PRIOR ART STATEMENT

I personally conducted an extensive search on the subject matter of this specification in the U.S. Patent Office. I uncovered several patents which deal with the pyrolytic application of metal oxide films on the surface of a heated glass substrate which will be discussed hereinbelow. These patents seemed to indicate that no particular controls were required in order to generate a metal oxide film on the surface of a heated glass substrate which would have desirable physical and chemical properties when used, for example, as an architectural glazing. The patents seemed to indicate further that no matter how one went about such a coating process, one would be successful.

In doing research work on pyrolytic coating with spray powder compositions, I learned that certain key parameters must be met in order to develop on the surface of the glass substrate a metal oxide film which would have chemical and physical durabilities necessary if that coated substrate is to be successfully used, for example, in an architectural glazing.

The patents that I uncovered that appear to be of interest are set forth individually hereinbelow.

U.S. Pat. No. 3,081,200, in column 3, line 13, shows that the patentee has sprayed both solutions and powders in order to form pyrolytic metal oxide coatings. The patent examples, however, are directed to solutions of coating materials and no specific instructions are contained in the patent with respect to how one successfully accomplishes the application of powders to form a pyrolytic metal oxide film on a glass substrate. This would lead one to believe that any sort of method would be successful. I have found that the methodology employed to develop such a film on a glass substrate does have to be controlled, as will be discussed in greater detail hereinbelow.

German Pat. Nos. 2,529,076; 2,529,077 and 2,529,079 deal with the development of metal oxide film on a glass substrate.

In the '076 patent, metal salt particles are charged prior to application to a glass substrate which has been preheated to a temperature in the range of from 500° to 650° C. The patent indicates that heat decomposable, organic based metal salts may be used and that a preheated carrier gas may be used for transporting the particles to the glass substrate. The patent teaches that the particles should be charged and distributed in a 90° downwardly directed attitude towards the glass substrate from a gas distributor which extends transverse to the direction of travel of the glass substrate passing therebelow. This patent teaches an electrostatic charging of the particles in order to develop a coated metal oxide film on the glass substrate along with a relatively low velocity discharge of the particles in a direction perpendicular to the glass substrate. I have found in my work that it is not necessary to charge the particles and one should not discharge the particles at a relatively low velocity in a direction perpendicular to the surface of the glass substrate which is to have the metal oxide film developed thereon.

German Pat. No. 2,529,077 discloses a process for forming a metal oxide film on a glass substrate by pyrolytic techniques. The starting material is a powder metal compound which is carried by an inert carrier gas into a cyclone where the smallest particles of the compound are separated from the coarser particles, subsequently carried along by the carrier gas flow to the surface of the glass substrate to be coated. The coarser particles are collected then partially evaporated under an inert atmosphere by heating. Thereafter, the resulting metal compound vapors are mixed with the carrier gas which carries the finer particles to the surface to be coated. Thus, this patent teaches the simultaneous application of both relatively fine heat decomposable, organic based metal salts and vaporized material of the same nature to the glass surface which is to have a metal oxide film developed thereon. The patent does not teach any criticality with respect to the coating process in order to develop a metal oxide film on the glass substrate which will have chemical and physical durability which will allow that coated glass substrate to be subsequently used in an architectural product. There is no teaching in this patent that certain spray conditions must be maintained in order to develop a metallic oxide film on a glass substrate which has excellent chemical and physical durability.

German Pat. No. 2,529,079 discloses a method in which relatively large particles of a heat decomposable material are dropped on a glass substrate in order to develop a film thereon. I have found that if relatively large particles are simply dropped upon the surface of a heated glass substrate, these large particles tend to burn at the point of impact on the surface and thereby form a discontinuous, spotted film of inferior chemical and physical durability. This patent does not teach the specific operating parameters which I have found necessary in the application of dry powder, heat decomposable, organic based salts to the surface of a heated glass substrate in order to generate thereon a metal oxide film which has excellent chemical and physical durability under commercial use conditions.

U.S. Pat. No. 3,852,098 discloses a process in which a glass substrate is coated with a metal containing film by heating the glass and contacting the hot glass with a gaseous mixture. The patent does not deal with the application of powder materials directly to the surface of the glass in order to develop a metal oxide coating thereon. Rather, the process disclosed is one which uses as the coating medium a gaseous mixture containing from 40 to 100% by volume of the vapors of a reactive metal compound. The mixture is heated by the glass to a sufficient temperature, causing the metal vapor compound to react, thereby depositing the coating film. This patent deals with coating of a glass substrate with a vapor coating system in which vaporized materials are directed against the surface to be coated. The patent has no instructional value to a skilled artisan with respect to how one would apply a dry powder spray of heat decomposable, organic based metal salts to a heated glass substrate in order to obtain thereon a metal oxide film of superior chemical and physical durability.

U.S. Pat. No. 4,182,783 is a patent directed a vapor deposition process for achieving a metallic oxide film on a glass substrate. The method discloses fluidizing particulate solid coating reactants by first establishing a fluidized bed of disbursed particulate solid coating reactants and thereafter drawing a volume of fluidized gas and suspended particulate solid coating reactants to a vaporizer. An additional volume of gas is mixed therewith and then all of the particulate solid coating reactants are vaporized in the reactant/gas mixture. This reactant/gas mixture is then directed into contact with a hot substrate to be coated in order to deposit a film thereon. This patent has absolutely no teachings directed to the application of dry spray materials onto the surface of a heated glass substrate in order to develop a chemically and physically durable metallic oxide film thereon.

U.S. Pat. No. 4,188,199 discloses a process for forming a metal compound coating on the face of a continuously longitudinally moving glass ribbon. The glass ribbon face is contacted while at an elevated temperature with a fluid medium containing a substance which undergoes chemical reaction or decomposition to form the metal compound on the face. The process includes the steps of discharging at least part of the fluid medium against the face in stream formation having velocity components both in the direction of movement of the glass ribbon and in a direction at an inclination to the face of the glass ribbon at a particular angular attitude. Specific examples contained in the patent show the projection of vaporized metal compounds and fluid mediums onto the surface of the glass. There is contained in the patent no discussion of how one would apply a dry power composition to the surface of a glass ribbon in order to achieve a metal oxide film thereon which has superior chemical and physical durability.

U.S. Pat. No. 4,230,271 discloses an apparatus for evenly and uniformly depositing particulate material suspended in a gas on at least one surface of a substrate. In particular, the substrate may be a strip of glass and the product placed thereon a metal salt. However, the discharge is in a downward direction towards the ribbon of glass. There is no further specific discussion of how to obtain a chemically and physically durable metal oxide coating film on a glass substate or what conditions are necessary to achieve such a coating film when a dry powder spray is being used.

The principal purpose of the method of this invention is to provide a method of placing a metal oxide film on the surface of heated glass substrate which is being moved in a selected direction from a glass manufacturing process, the metal oxide film having excellent characteristics with respect to both chemical durability and physical durability.

More specifically, an object of this invention is to provide a method of placing a metallic oxide film on the surface of a heated glass substrate which is being moved in a selected direction from a glass manufacturing process by the pyrolytic application of a dry, heat decomposable, metallic salt spray powder, the metal oxide film having excellent characteristics with respect to both chemical durability and physical durability

DISCLOSURE OF THE INVENTION

This invention is directed to a method of placing a metal oxide film on a surface of a heated glass substrate which is being moved in a selected direction from a glass manufacturing process. The metal oxide film is developed by pyrolytic coating techniques.

In accordance with the teachings of the method of this invention, the following steps are carried out. A spray powder having individual particles with a size in a range from 0.5 to 50 microns is prepared. The spray powder is formed from organic based metal salts which are heat decomposable. The spray powder is delivered by means of a gaseous stream to a location spaced above the moving glass substrate. The glass substrate has a temperature in a range from 700° F. (370° C.) to 1200° F. (650° C.).

The spray powder is accelerated from the location spaced above the moving glass substrate. The accelerating of the spray powder is accomplished by entraining the spray powder in a high velocity stream of air, which causes individual particles of the spray powder both to be accelerated to velocities in a range of from 20 feet per second (6 meters per second) to 250 feet per second (76.2 meters per second) and to separate the individual particles of the spray powder.

The accelerated spray powder entrained in the high velocity stream of air is directed in directions which fan outwardly, both downwardly toward the moving glass substrate and longitudinally along the selected direction of movement of the glass substrate. In this manner, separated individual particles of the spray powder are either rapidly brought to a location in juxtaposition to the surface of the glass substrate whereat the individual particles of the spray powder are vaporized, decomposed and reacted with oxygen to form a tightly adherent coating on the glass substrate, or are rapidly exhausted from the location in juxtaposition to the surface of the glass substrate because the individual particles fail to vaporize, decompose or react within an acceptable residence time required for forming a tightly adherent coating on the moving glass substrate.

By an acceptable residence time, I mean a time period from 0.02 seconds to 0.3 seconds. If individual coating particles do not react to form a tightly adherent coating on the glass substrate and fail to be exhausted within the acceptable residence time, then these particles interfere with the coating process by stripping the available sites on the glass that can react with a properly reactive coating particle, which results in the formation of a coating film that is not chemically and physically durable as when such individual particles are either reacted or exhausted within the acceptable residence time.

My definition of a tightly adherent coating film is a film which will withstand certain chemical and physical testing which creates conditions much more severe than the exposure of that film to conditions found in normal glazing applications. I will describe in a later portion of this specification two tests which I use to determine in one case the chemical durability of the film on the glass substrate and in the other case the physical durability of that film.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

BEST MODE AND INDUSTRIAL APPLICABILITY

The following description is what I consider to be a preferred embodiment of my method of placing a metal oxide film on a surface of a heated glass substrate. The following description also sets forth what I now contemplate to be the best mode of carrying out the method of this invention. This description is not intended to be a limitation upon the broader principles of this method, and while preferred materials are used to illustrate the method in accordance with the requirements of the patent laws, it does not mean that the method is operative only with the stated materials as others may be substituted therefor.

Also, for example, the method disclosed herein may be successfully used with materials yet to be developed by skilled artisans such as newly developed heat pyrolyzable metallic salts. It is therefore contemplated by me that the method disclosed in this specification may also be successfully used with materials which are yet to be developed because the principles of operation of the method remain the same, regardless of the particular materials used with the method.

The method of my invention is a method for placing a metal oxide film on a surface of a heated glass substrate. The method is used to place the film on the glass substrate as that substrate is being moved in a selected direction from a glass manufacturing process, for example, a float glass manufacturing process.

The method of my invention is initiated by preparing a spray powder of particulate material. The spray powder has individual particles with a size in a range from 0.05 to 50 microns. The preferred size range is from 2 to 15 microns. If the particle size is above 50 microns, the particles generally do not coat the substrate but rather fall on the substrate and are burned in situ so as to produce a dark burned mass on the glass. If the particles are under 0.05 microns, they cause difficulty because decomposition of such particles often takes place prior to coming into reactive contact with the glass surface.

In general, the powder material is formed from an organic based metal salt which is heat decomposable, for example, metal acetyl acetonates. The particular acetyl acetonates or group of such materials which are selected depends upon the desired properties of the coating film. In accordance with the teachings of a preferred embodiment of this invention, I will use a powder which is made up of 76% by weight cobalt acetyl acetonate, 12% by weight iron acetyl acetonate, and 12% by weight chromium acetyl acetonate. This powder is applied to a green body color glass in order to develop a coated glass substrate which is suitable as a glazing for a building. This glazing has the right characteristics for shading coefficient, visual transmission and reflectivity for building applications.

Figure 1:
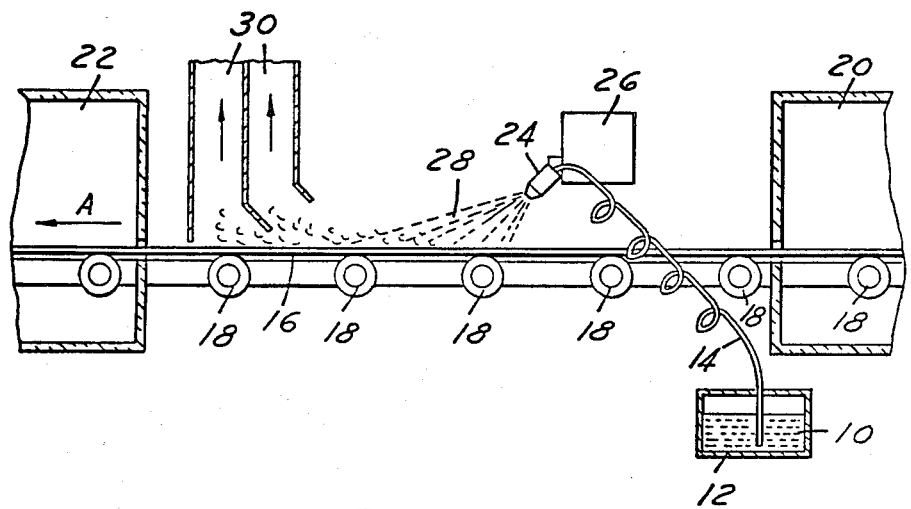
FIG. 1 is a schematic view in elevation of apparatus for carrying out the method of this invention.
Figure 2:
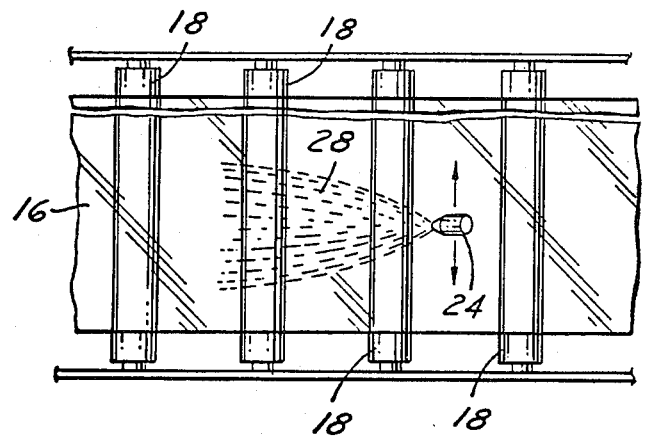
FIG. 2 is a plan view of the apparatus of FIG. 1.

A supply of dry coating powder 10 is kept in a powder supply device 12 for storage purposes. In a manner well known in the art, the dry powder 10 is entrained in a gaseous stream, such as a stream of air, and then moved through a supply tube 14. In this manner, the dry powder 10 is delivered by means of the supply tube 14 to a location spaced above a glass substrate 16. The glass substrate is supported on movable rolls 18—18 for movement in the direction of arrow A of FIG. 1. The glass substrate is moved from a float chamber 20 in which the substrate is manufactured to and through an annealing lehr 22 in which the glass is cooled and annealed in a manner well known. The method of my invention in this preferred embodiment takes place in the location spaced between the float chamber and the annealing lehr. In this location, the glass substrate has a temperature in the range from 700° F. (370° C.) to 1200° F. (650° C.). This temperature range is sufficiently high to vaporize the organic based metal salts so that the metals may react with oxygen in the ambient surrounding the glass substrate or with oxygen in the glass substrate itself in order to form a metallic oxide film on the glass substrate 16.

At a location spaced above the surface of the glass substrate 16, there is located a spray nozzle 24. This spray nozzle is attached to a spray nozzle reciprocating device 26 which moves the spray nozzle back and forth across the width of the glass ribbon 16 passing therebelow. In accordance with the teachings of the preferred embodiment of this invention, the spray nozzle is located at a 30° angle with respect to the glass substrate passing therebelow, and the distance of the nozzle on the direct path from the gun to the glass is 9.5 inches (24.2 cm). With the particular composition noted above making up the spray powder 10, the film placed on the glass substrate will have a composition of 18% iron oxide, 9.5% chromium oxide, and the balance will be cobalt oxide.

Chemical and physical durabilities of this film composition are measured by two separate tests. Chemical durability is measured by a first procedure in which a coated sample is subjected to a five hour hydrochloric acid vapor test. In this case, hydrochloric acid vapors surrounded the material and attempted to attack the coating on the glass. An attack of the coating changes the level of transmission of solar energy through the glass. There is a greater amount of energy transmitted as the durability of the film is attacked. The change in transmission characteristics of the coated glass to the transmission of energy therethrough is considered acceptable if it is in a range of 15% or less, any greater change of the film being considered unacceptable. In this case the change was less than one percent for this film composition.

The second test is a test of physical durability. In this test the sample is initially heat tempered. Thereafter, the tempered test sample is subjected to a humidity test in which the sample is subjected to a 100% humidity at 120° F. (66° C.) for a period of six weeks. The high humidity can cause the coating on the surface to loosen its adherence to the surface and come free. The measurement of durability is that the surface coating stays in place for the prolonged period of time and no less than one percent of the coating is removed therefrom. If any greater amount of material is removed, the sample is rejected as failed. In this case, the change was again less than one percent for this film composition.

The spray nozzle 24 is designed so that additional air is added to the spray powder being carried in the supply tube 14. The purpose of adding the air is to accelerate the spray powder from the location of the gun spaced above the moving glass substrate. The acceleration is accomplished by entraining the spray powder in a high velocity stream of air which causes individual particles of the spray powder both to be accelerated to velocities in the range of from 20 feet per second (6 meters per second) to 250 feet per second (76.2 meters per second) and to separate the individual particles of the spray powder. I accomplish this acceleration in the preferred embodiment by a commercially available device called a transvector which has a capability of amplifying the air coming out of the nozzle of the transvector twenty times its input air volume. The thrust of the output air of the nozzle is in a preferred range.

An important aspect of the method of this invention is the acceleration step. If the powder is not accelerated, then final film quality suffers. Generally, if no acceleration is used, the film is nonadherent to the glass and it has poor durability in the acid test. Also, for example, if the air which I add at the spray gun to accelerate the powder would be added at the powder supply device 12 in order to entrain the dry powder 10 in the supply tube 14, the additional air at that point will not accomplish the acceleration desired, but in fact will cause a flooding condition, meaning the powder to air ratio is too high and powder velocity too slow to achieve good film quality. The velocity range set forth is a critical range because if individual particles are moved at a velocity less than 20 feet per second, powder particles are just sprinkled onto glass surface without any significant movement therealong. Such particles tend to burn onto glass surface at first point of contact which results in an inferior film. If individual particles are moved at a speed greater than 250 feet per second, deposition efficiency is reduced substantially because the individual particles are moving so fast that they do not have sufficient residence time to vaporize and leave a coating film behind. The preferred range of velocities is in a range from 180 to 220 feet per second.

It is also another important aspect of the method of this invention that the accelerated spray powder stream have certain directions as it moves from the spray nozzle 24 toward the surface of the glass substrate 16 therebelow. The accelerated spray powder is directed in the high velocity stream of air in directions which fan outwardly, both downwardly toward said moving glass substrate and longitudinally along the selected direction of movement of the glass substrate.

A fan shaped spray 28 is developed thereby. Some of the important characteristics of this fan shape 28 are as follows. Because of the fan shaped spray generated by accelerating the entrained spray powder as discussed above, two things can happen to individual particles of the spray powder. A first thing that can happen is that these particles can be rapidly brought to a location in juxtaposition to the surface of the glass substrate 16 whereat these individual particles of spray powder are vaporized, decomposed and reacted with oxygen to form a tightly adherent coating on the glass substrate. A second thing that can happen to these particles is that they are rapidly exhausted from the location in juxtaposition to the surface of the glass substrate because these individual particles failed to vaporize, decompose or react within an acceptable residence time required for forming a tightly adherent coating on the moving glass substrate. An exhaust hood 30, shown only in FIG. 1, is used for withdrawing the exhausted spray powder from engagement with the surface of the glass substrate.

I have found that if the spray powder is allowed to remain for an unacceptable residence time, then the coating quality both with respect to its chemical and physical characteristics is degraded. This degradation comes about because coating deposition is nonuniform. Defects I refer to as "Comets" and "Worms" are formed by light and dark areas being formed in a nonuniform manner. By an acceptable residence time, I mean from 0.02 seconds to 0.3 seconds.

In general, the spray powder which does react to form a coating, reacts by having the powder vaporize, thereafter decompose so that the organic portion thereof may be exhausted, and so that the metal portion thereof may react with oxygen in the gas stream accelerating the spray powder or to react with oxygen forming the surface of the glass substrate.

Normally, in the coating operation, approximately 10 to 12% of the material sprayed reacts with and stays behind as a coating on the glass substrate. This is much more efficient that spray processes using materials dissolved in a solvent. In those solvent spray situations, approximately 5% of the material sprayed remains behind as the coating on the surface of the glass substrate.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of placing a metal oxide film on a surface of a heated glass substrate which is being moved in a selected direction from a glass manufacturing process, the method comprising the steps of:

delivering a spray powder by means of a gaseous stream to a location spaced above said moving glass substrate, said glass substrate having a temperature in a range from 700° F. (370° C.) to 1200° F. (650° C.), said spray powder having individual particles with a size in a size range from 0.05 microns to 50 microns formed from organic based metal salts which are heat decomposable;

accelerating said spray powder from said location spaced above said moving glass substrate, said acceleration being accomplished by entraining said spray powder in a high velocity stream of air which causes individual particles of said spray powder both to be accelerated to velocities in a range of from 20 feet per second (6 meters per second) to 250 feet per second (76.2 meters per second) and to separate said individual particles of spray powder; and directing said accelerated spray powder entrained in said high velocity stream of air in directions which fan outwardly, both downwardly toward said moving glass substrate and longitudinally along said selected direction of movement of said glass substrate whereby separated, individual particles of said spray powder are either rapidly brought to a location in juxtaposition to said surface of said glass substrate whereat said individual particles of said spray powder are vaporized, decomposed and reacted with oxygen to form a tightly adherent coating on said glass substrate, or are rapidly exhausted from said location in juxtaposition to said surface of said glass substrate because said individual particles fail to vaporize, decompose or react within an acceptable residence time required for forming a tightly adherent coating on said moving glass substrate.

2. A method of placing a metal oxide film on a surface of a heated glass substrate which is being moved in a selected direction from a glass manufacturing process, the method comprising the steps of:

preparing a spray powder having individual particles with a size in a size range from 0.05 microns to 50 microns, said spray powder being formed from organic based metal salts which are heat decomposable;

delivering said spray powder by means of a gaseous stream to a location spaced above said moving glass substrate, said glass substrate having a temperature in a range from 700° F. (370° C.) to 1200° F. (650° C.);

accelerating said spray powder from said location spaced above said moving glass substrate, said acceleration being accomplished by entraining said spray powder in a high velocity stream of air which causes individual particles of said spray powder both to be accelerated to velocities in a range of from 20 feet per second (6 meters per second) to 250 feet per second (76.2 meters per second) and to separate said individual particles of spray powder; and directing said accelerated spray powder entrained in said high velocity stream of air in directions which fan outwardly, both downwardly toward said moving glass substrate and longitudinally along said selected direction of movement of said glass substrate whereby separated, individual particles of said spray powder are either rapidly brought to a location in juxtaposition to said surface of said glass substrate whereat said individual particles of said spray powder are vaporized, decomposed and reacted with oxygen to form a tightly adherent coating on said glass substrate, or are rapidly exhausted from said location in juxtaposition to said surface of said glass substrate because said individual particles fail to vaporize, decompose or react within an acceptable residence time required for forming a tightly adherent coating on said moving glass substrate.

3. The method of claim 2, wherein said acceptable residence time is a time period from 0.02 to 0.3 seconds.

4. A method of placing a metal oxide film on a surface of a heated glass substrate which is being moved in a selected direction from a glass manufacturing process, the method comprising the steps of:

preparing a spray powder having individual particles with a size in a size range from 2 microns to 15 microns, said spray powder being formed from organic based metal salts which are heat decomposable;

delivering said spray powder by means of a gaseous stream to a location spaced above said moving glass substrate, said glass substrate having a temperature in a range from 700° F. (370° C.) to 1200° F. (650° C.);

accelerating said spray powder from said location spaced above said moving glass substrate, said acceleration being accomplished by entraining said spray powder in a high velocity stream of air which causes individual particles of said spray powder both to be accelerated to velocities in a range of from 180 feet per second (55 meters per second) to 220 feet per second (67.2 meters per second) and to separate said individual particles of spray powder; and directing said accelerated spray powder entrained in said high velocity stream of air in directions which fan outwardly, both downwardly toward said moving glass substrate and longitudinally along said selected direction of movement of said glass substrate whereby separated, individual particles of said spray powder are either rapidly brought to a location in juxtaposition to said surface of said glass substrate whereat said individual particles of said spray powder are vaporized, decomposed and reacted with oxygen to form a tightly adherent coating on said glass substrate, or are rapidly exhausted from said location in juxtaposition to said surface of said glass substrate because said individual particles fail to vaporize, decompose or react within an acceptable residence time required for forming a tightly adherent coating on said moving glass substrate.

5. The method of claim 4, wherein said acceptable residence time is a time period from 0.02 to 0.3 seconds.

* * * * *